Nov. 26, 1935.   J. H. WRIGLEY ET AL   2,021,975
METHOD OF AND MEANS FOR TREATING WOVEN AND THE LIKE FABRICS AND YARNS
Filed Dec. 30, 1932   6 Sheets-Sheet 1
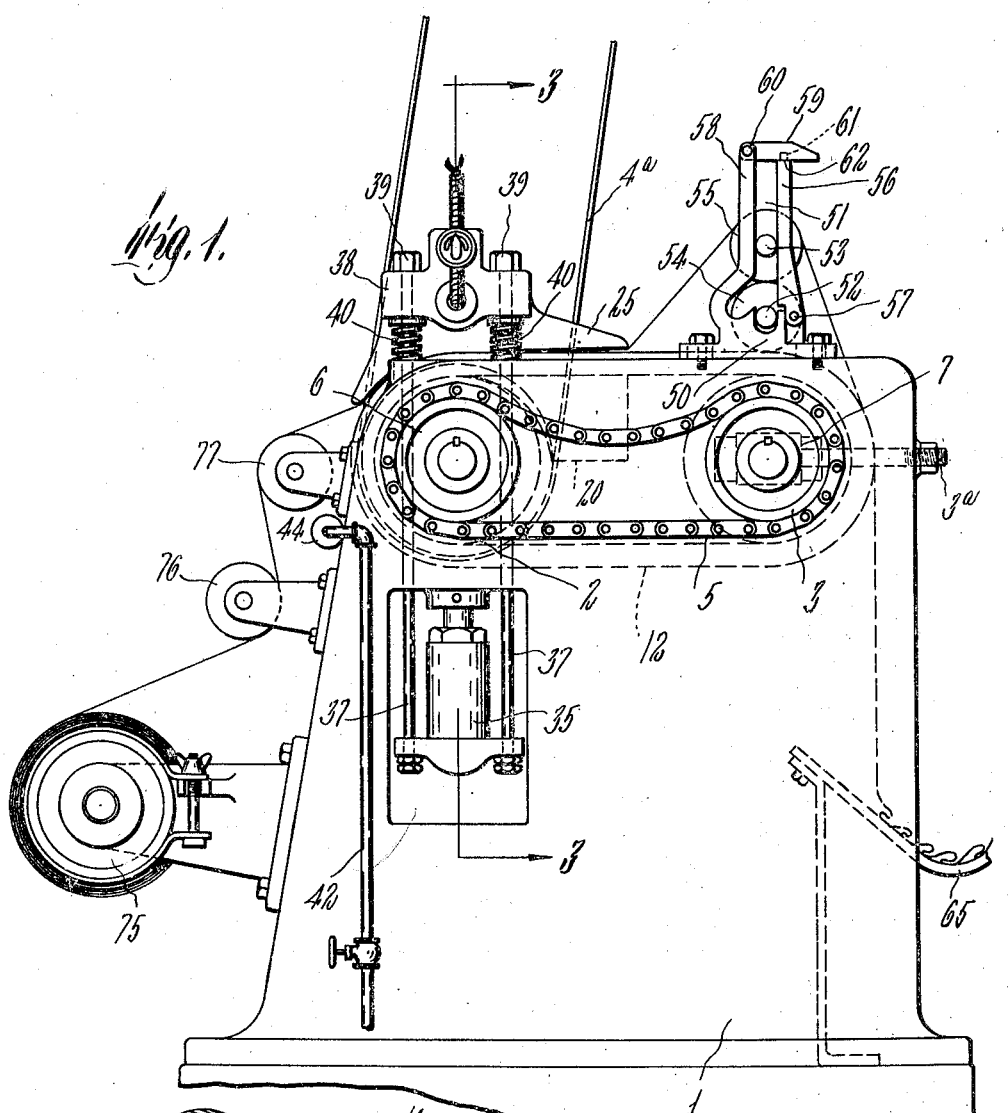
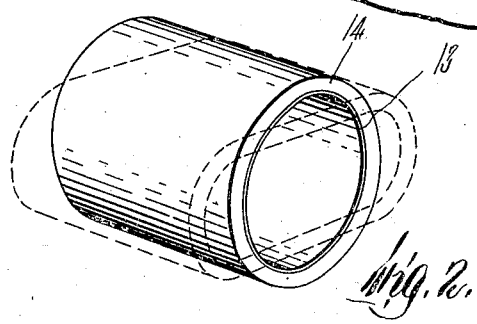

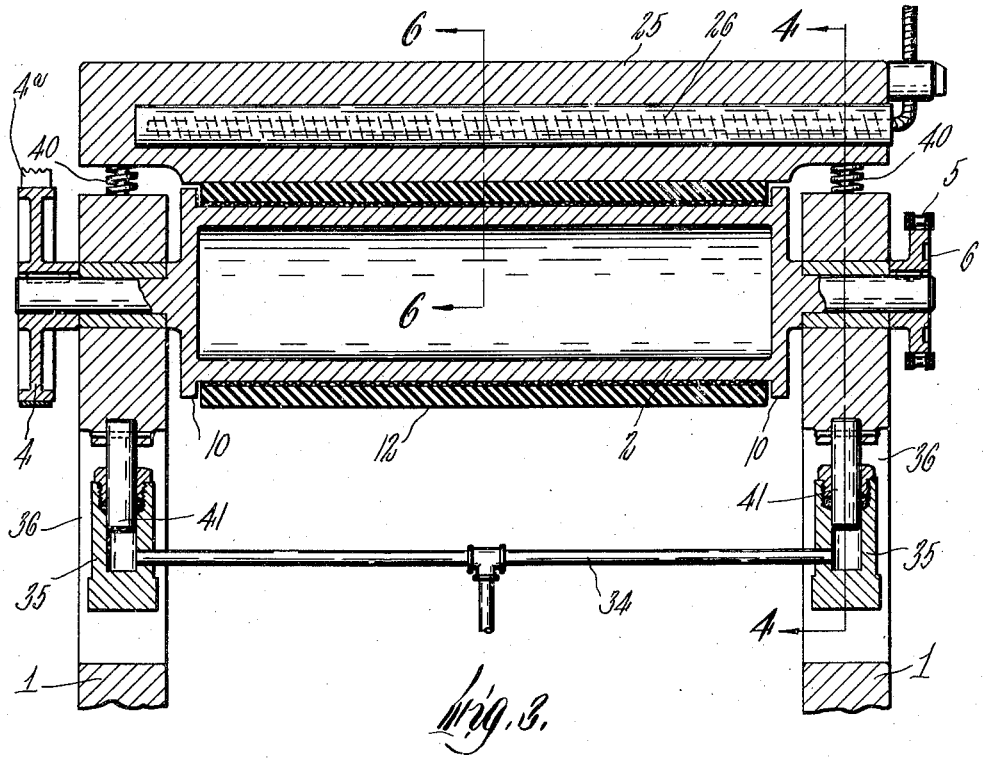
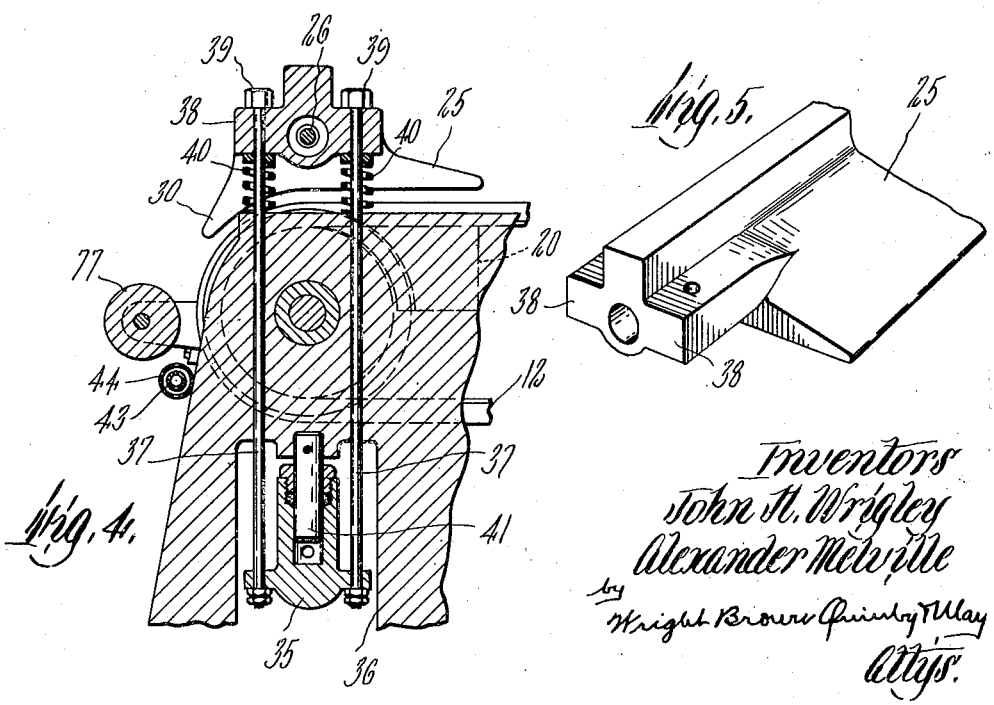

Nov. 26, 1935. J. H. WRIGLEY ET AL 2,021,975
METHOD OF AND MEANS FOR TREATING WOVEN AND THE LIKE FABRICS AND YARNS
Filed Dec. 30, 1932 6 Sheets-Sheet 3
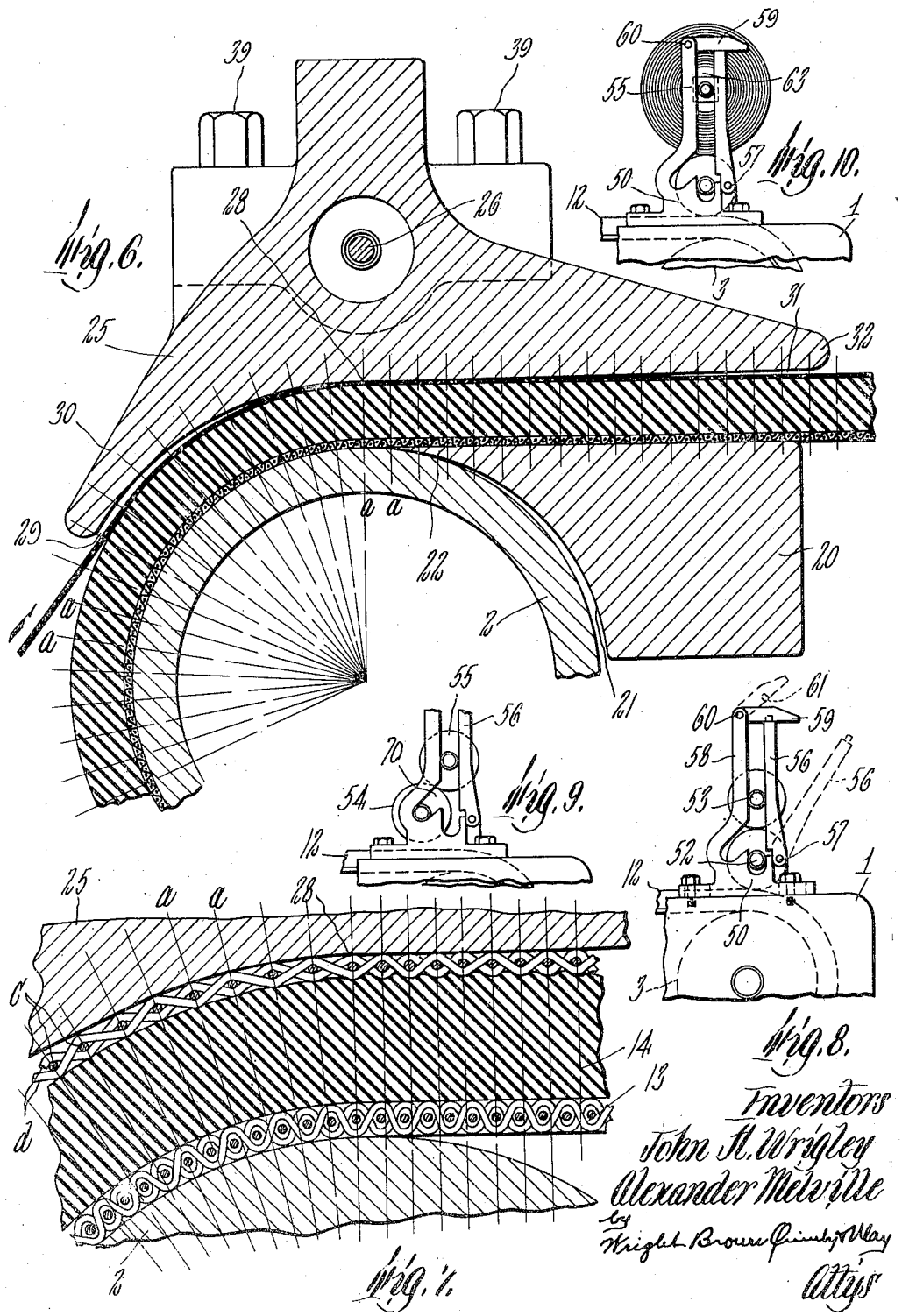

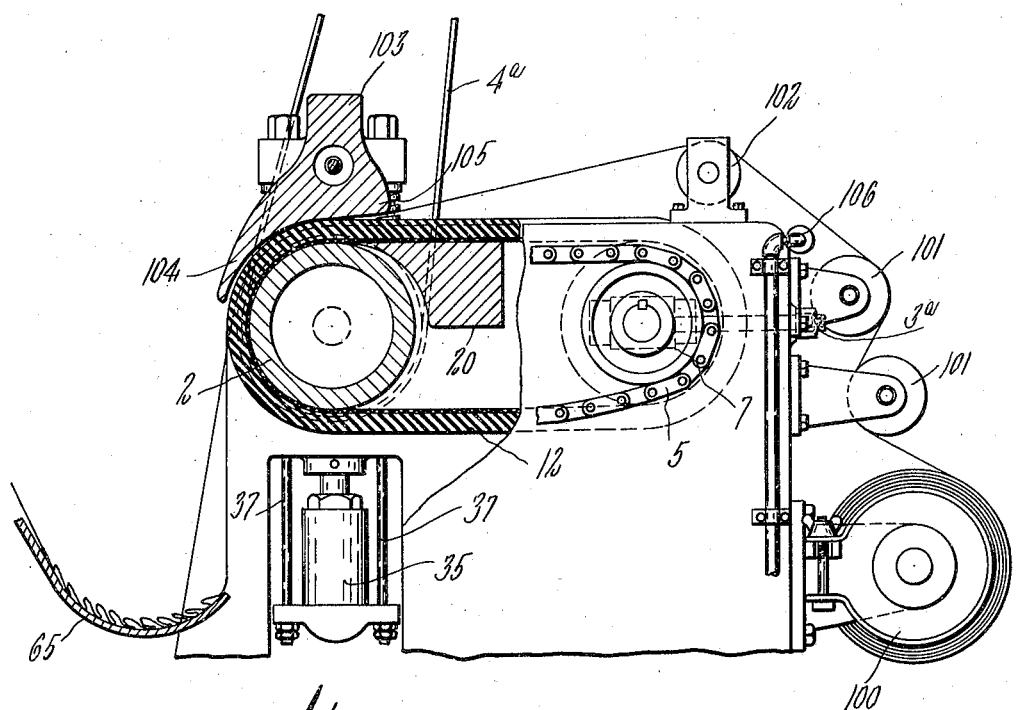
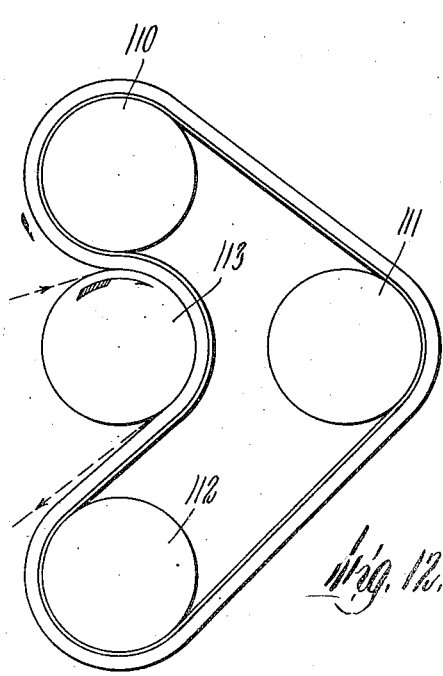
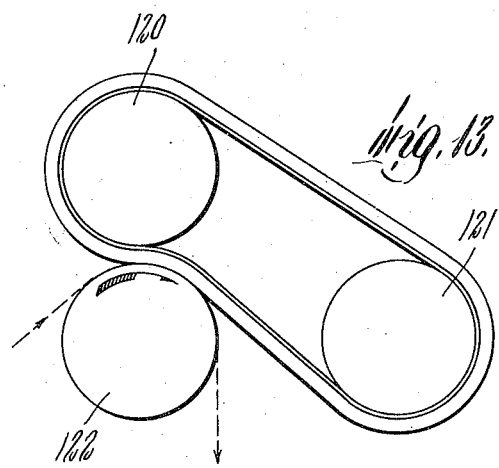

Nov. 26, 1935. J. H. WRIGLEY ET AL 2,021,975
METHOD OF AND MEANS FOR TREATING WOVEN AND THE LIKE FABRICS AND YARNS
Filed Dec. 30, 1932 6 Sheets-Sheet 5
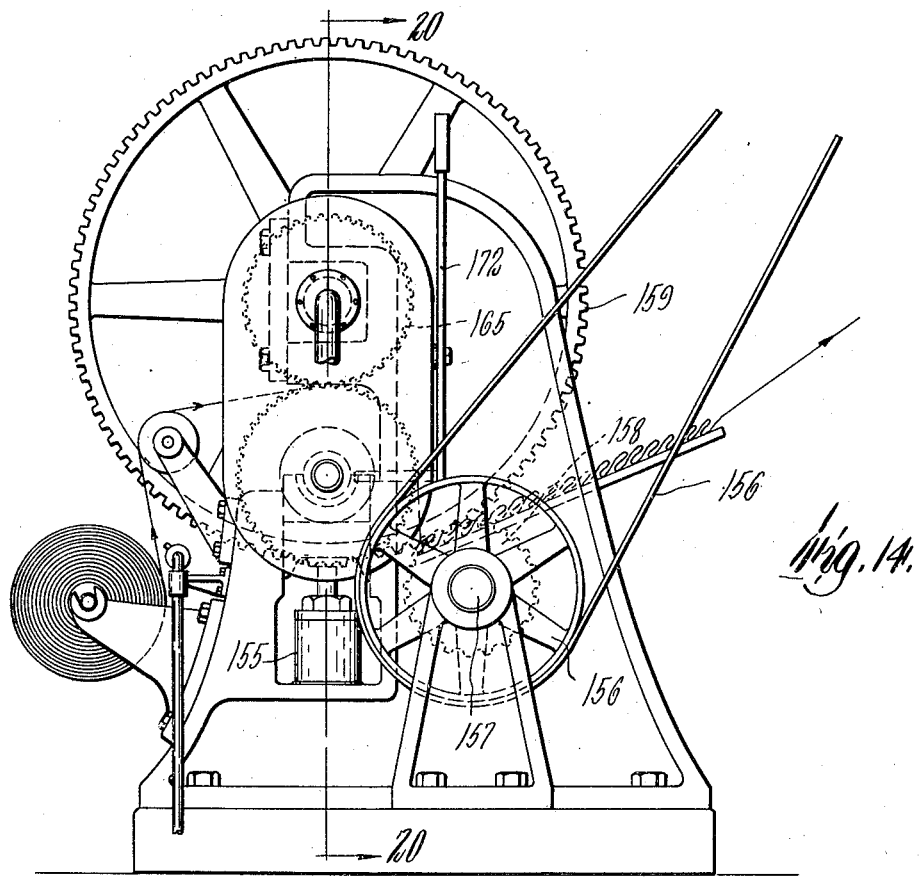
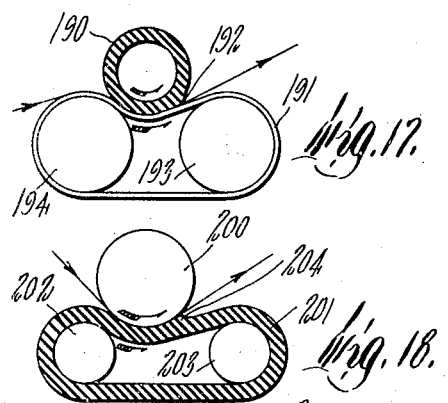
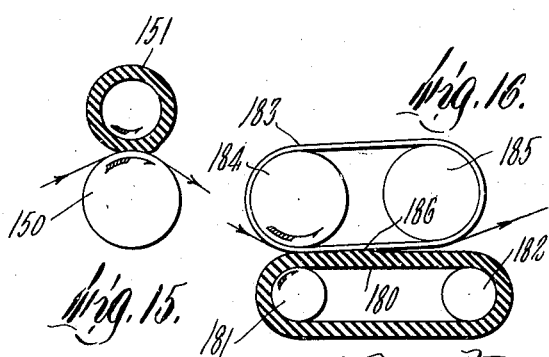
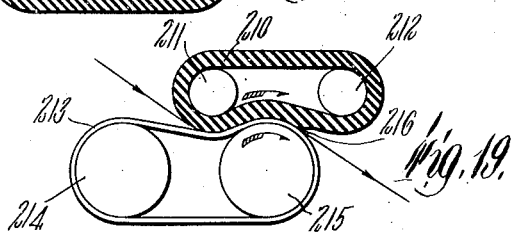

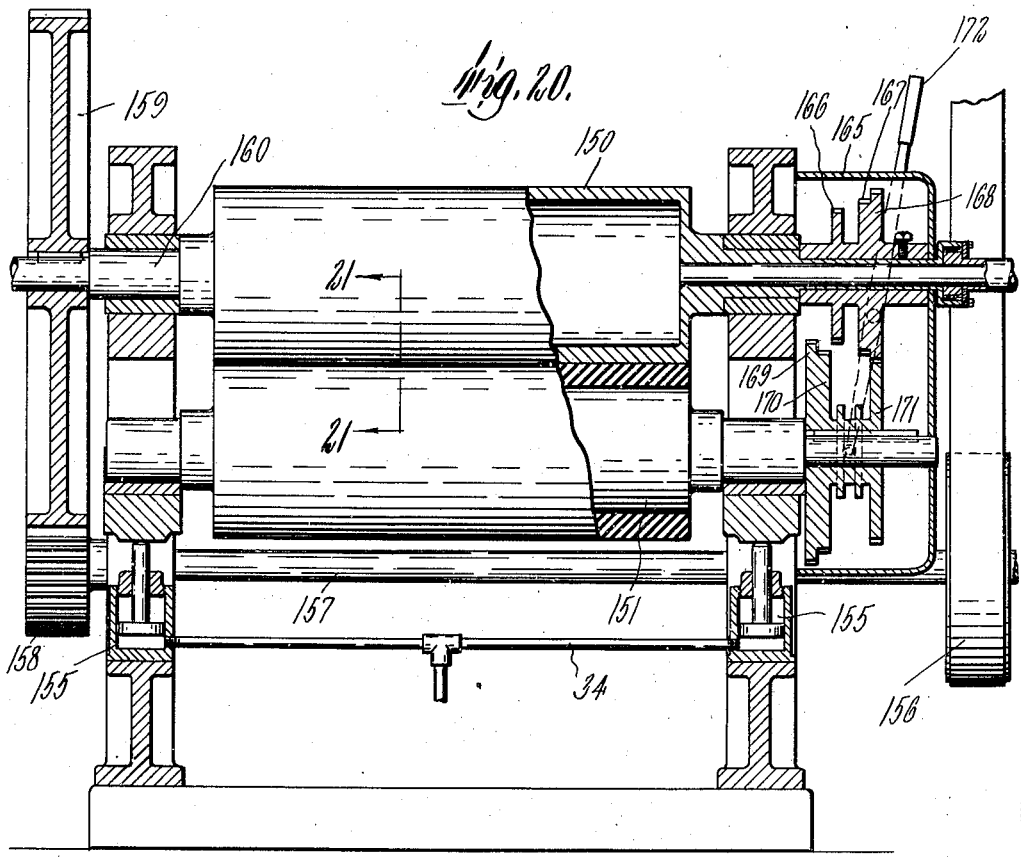
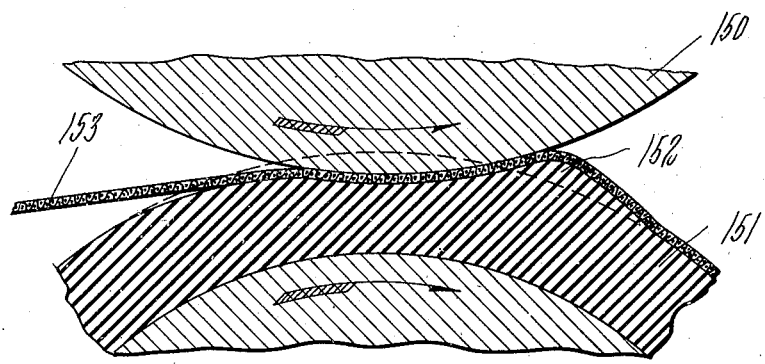

Patented Nov. 26, 1935

2,021,975

UNITED STATES PATENT OFFICE 2,021,975

METHOD OF AND MEANS FOR TREATING WOVEN AND THE LIKE FABRICS AND YARNS

John Herbert Wrigley, Worthington, near Wigan, and Alexander Melville, Standish, near Wigan, England, assignors, by mesne assignments, to Cluett Peabody & Co. Inc., Troy, N. Y., a corporation of New York Application December 30, 1932, Serial No. 649,528
In Great Britain February 10, 1931

33 Claims. (Cl. 26—42)

This invention relates to the treatment of woven or the like fabrics and yarns for the purpose of changing dimensional characteristics thereof. For example, in the weaving of cloth the warp strands are ordinarily under a considerable degree of tension so that in the woven cloth they are in a relatively straight condition, while the weft or filling strands are sinuated to a much greater degree as they pass partly around the warp strands. Bleaching, dyeing and finishing operations to which cloth is often subjected may also cause elongation thereof with consequent tensioning of the warp strands. When such cloth is subjected to laundering operations in use, the more highly tensioned warp strands contract and become more sinuous, passing further around the weft or filling strands, and this results in shrinking of the cloth lengthwise. It is therefore desirable that cloth be pre-shrunk to substantially that ultimate condition resulting from several launderings in order that garments made therefrom will retain their original shapes and sizes in service, and without impairing the finish or otherwise injuring the goods, and to do this quickly and cheaply. Various methods of and mechanisms for pre-shrinking have previously been employed which, however, have certain great disadvantages. In one method the fabrics are subjected to alternate wetting and drying, while under unstretched condition and with freedom to contract. The extent of shrinking by such treatment is dependent on the nature and texture of the fabric and the humidity and temperature conditions under which the treatment is carried out.

In accordance with another method the fabric is subjected to soaping and boiling actions while in rope or open width condition while being held as free as possible from any stretching forces during subsequent drying.

Both of these methods are costly and time consuming, remove starch and waxes, render the yarns more fuzzy by loosening the ends of the fibers, tend to decrease the strength of the cloth and in general impair its finish.

After using either of these methods it is usually necessary to subject the fabrics to various finishing and dyeing operations during which the fabrics are tensioned lengthwise. Moreover, fabrics so treated lack the desired finish and luster which could be produced by a calendering operation which, however, would act to stretch them.

It has also been proposed to employ a felt or fabric belt against one face of which the material to be shrunk is pressed while this belt is being passed through a path of changing curvature such as to contract the surface of the belt with which the material is in contact. This method will be further discussed herein.

Under certain conditions and for certain purposes also it may be desired to stretch rather than shrink woven or other fabrics or yarns.

The present invention, therefore, has for its object to provide methods and means by which either shrinking or stretching may be produced and without impairing the finish or otherwise injuring the goods and to do this quickly and cheaply. Indeed by the methods of this invention the finish of the goods may be materially improved in many instances.

According to the present invention the dimensional changes in the material are produced after the usual finishing operations which may include dyeing, mercerizing, calendering, etc. and this is accomplished by the mechanical action of material presenting a continuous but extensible and contractible surface to which the fabric or other material to be treated may be temporarily caused to engage during such contraction or extension, depending on whether shrinking or stretching is desired. Furthermore, the contraction, and in some cases even the extension of the surface may be produced by the force of elastic recoil or come-back of a substantially incompressible but deformable body having this surface from an elastically deformed toward a normally undeformed condition. In the rubber bodies illustrated herein, the web-engaging side retains elastic structural continuity during all conditions of distortion produced in the ways hereinafter described, that is, the web-engaging side of the body is distorted in opposition to its elasticity, which is maintained throughout the distortion by the cohesive nature of the rubber employed to form the web-engaging side. Various ways of deforming the body may be employed. For example, the body may be in the form of a relatively thick rubber or rubber-like belt backed up on one side, if desired, by a relatively inextensible and incontractible web of textile or the like, this belt having its outer rubber surface extended by passing the belt in convexed relation about a pulley or drum, the material being deformed by this action, the exposed surface then being allowed to contract more or less by causing the belt surface to take a less convex path such as a straight path or even a concave path if desired. The desired distortion of the body may, however, be produced by other means. For example, it may be done by subjecting the body progressively to a pressure both transverse and in line with its surface, or this distortion may be done by combinations of methods, as will more fully appear.

This application is a continuation in part of our applications for patent Serial No. 540,382 Method of shrinking woven and the like fabrics; Serial No. 540,383, Method of stretching or elongating woven or like fabrics, and Serial No. 540,384 Apparatus for treating woven and like fabrics and yarns.

For a more complete understanding of this invention, reference may be had to the accompanying drawings in which Figure 1 is a somewhat diagrammatic side elevation of a shrinking machine of one type which embodies the invention.

Figure 2 is a fragmentary perspective of a shrinking belt which may be used in the machine shown in Figure 1.

Figure 3 is a detail section on line 3—3 of Figure 1.

Figure 4 is a detail section on line 4—4 of Figure 3, but showing the ironing bar in raised position.

Figure 5 is a fragmentary perspective of the ironing bar.

Figure 6 is a detail section to a much larger scale on line 6—6 of Figure 3.

Figure 7 is a somewhat diagrammatic view similar to a portion of Figure 6 but on a much larger scale.

Figures 8 and 9 are fragmentary side elevations of the machine showing the shrinkage adjusting mechanism arranged to secure different amounts of ultimate shrinkage from its arrangement in Figure 1.

Figure 10 is a similar view showing a modification but for a different purpose.

Figure 11 is a fragmentary side elevation partly in section of a machine somewhat similar to that shown in Figure 1, but arranged to stretch rather than to shrink.

Figures 12 and 13 are diagrammatic views illustrating modified arrangements of material engaging members particularly suitable for shrinking but capable of stretching.

Figure 14 is a somewhat diagrammatic side elevation of a machine of a different type which, if desired, may be used either for shrinking or stretching.

Figures 15 to 19, inclusive, are diagrams showing various arrangements of material-treating members which may be used in a machine of the general type of that shown in Figure 14.

Figure 20 is a section on line 20—20 of Figure 14.

Figure 21 is a detail section to a larger scale on line 21—21 of Figure 20.

Referring first to the construction shown in Figures 1 to 7, in which a machine particularly designed for shrinking textile material is illustrated, the machine as shown comprises spaced side frame members 1, in the upper portions of which are journaled in spaced relation a pair of pulleys or drums 2 and 3. One of these pulleys or drums, as 2, is provided with suitable means for rotating it, such as a belt pulley shown at 4 in Figure 3, about which is passed a driving belt 4a, and as shown best in Figure 1, the other drum or pulley 3 may be driven therefrom as by means of a sprocket chain 5 passing about sprocket wheels 6 and 7 secured to these respective pulleys or drums. As shown these pulleys or drums are provided with end flanges 10 between which rides a belt 12. This belt, as shown best in Figure 2, is relatively thick and is provided with an inner layer as 13 of a relatively inextensible incontractible material such as a closely woven textile belt, to the outer face of which is secured a relatively incompressible but distortable body of material, such as rubber, forming a layer of substantial thickness, say, an inch or even more, at 14. This belt passes about the pulleys or drums 2 and 3 under sufficient tension to cause the portions of the rubber layer 14, which are convexed about the pulleys, to be distorted, the rubber being stretched so that the smooth outer surface thereof becomes elongated. This tension may be produced by adjustment of the pulleys or drums 2 and 3 from each other as by the use of screws 3a operating on the bearings for the pulley or drum 3. Since the inner layer 13 is relatively inextensible and non-contractible with respect to the rubber, it defines the neutral axis for the belt as a whole, and since it passes about the pulleys or drums closer to the axis thereof than can the outer surface portion of the belt as a whole, this outer surface portion is compelled to take a longer path than the inner surface with the resultant distortion of the rubber and a superficial extension of the outer area of the belt where it is convexed over the pulleys. Between the pulleys 2 and 3 and beneath the upper relatively flat stretch of the belt is positioned a heavy rigid support 20 which has a face 21 curved to such a degree that it forms a thinned edge portion 22 (see Figure 6) which extends close to the surface of the pulley 2 and in position to support the belt as close as possible to the point where it leaves the surface of the pulley 2 without interfering with the rotation of the pulley.

Above the belt and over the pulley 2 is positioned an ironing member 25 which is preferably provided with suitable means by which it may be heated, as, for example, an electric heating unit 26 which may be placed therein. This ironing member 25 has a lower face preferably shaped to conform substantially to the surface of the belt as it passes around the pulley 2 and leaving this pulley passes over the support 20. Its lower surface is shown as relieved in either direction from a transverse line at 28 which is positioned where the belt is just leaving contact with the pulley 2 and passing over the support 20, this relief being in opposite directions so as to provide a space 29 between a lip portion 30 and the belt surface where it is convexed and a space 31 at the lip portion 32 where the belt passes out from beneath it. It is not necessary, however, that the lower face of the ironing member should substantially conform to the belt surface, a member with a flat lower face being effective for the purpose.

Provision is made for pressing the ironing member 25 under heavy pressure toward the belt surface and as shown this comprises hydraulic cylinders 35 which are shown as positioned within recesses 36 in the side frame members 1 and which are connected through rods 37 extending up through the side frames with extensions 38 at opposite ends of the ironing bar 25 through which these rods 37 pass and have nuts 39 threaded on their upper ends. Springs 40 surrounding the rods 37 and positioned between the extension 38 and the top faces of the side frames 1 tend to hold the ironing bar elevated but by admitting fluid under pressure through the pipe 34 and controlled by a suitable valve, (not shown) into the cylinders 35, these cylinders are brought down and press the ironing bar toward the belt. Plungers 41 riding in these cylinders 35 have their upper ends secured to the side frames 1 within the recesses 36.

The textile material, such as woven or knitted goods or even yarns, if desired, is passed between the belt and the ironing bar and is held against the belt surface under heavy pressure where the outer surface of the belt passes from its convex path to the relatively straight path over the support 20. When the textile material, which as shown in Figures 6 and 7 as a conventional woven fabric, first engages the outer surface of the belt where it is convexed and passes about the pulley 2, the surface portion of the belt to which it is first presented is in elongated condition, the rubber portion of the belt being distorted. This is shown by the radial lines $a$ drawn from the axis of the pulley 2, which it will be seen are more widely spaced at the outer surface of the belt than they are at the textile inner surface, which is substantially undeformed by its passage around the pulley 2. At about the point 28, however, where the belt passes from a curved to a straight path, the distortion of the rubber portion of the belt begins to be released, movement of the inner portion of the belt a distance between adjacent lines $a$ forwardly in the direction of the belt travel from the point 28, corresponding to an equal distance of movement of the outer face of the rubber portion of the belt, this being shown in Figures 6 and 7.

Referring particularly to Figure 7, it will be seen that the textile material to be shrunken, when presented to the nip between the ironing bar 25 and the belt, enters with its warp strands $d$ relatively straight about its filling strands $c$. As cloth comes from the loom and also from various treatments to which it may have been subjected these warp strands $d$ are relatively straight in the fabric, being sinuated somewhat to pass partially around the filling strands $c$, which, however, are under less tension than the warp strands and are sinuated transversely to pass above and below the warp strands. In this condition the weft or filling strands are spaced relatively widely when the cloth is presented to the rubber surface. As this textile material passes more and more into the nip between the ironing bar and the belt surface the textile material to be treated becomes confined between the ironing bar and the body of the rubber, the surface of which becomes impressed to conform to the surface configuration of the textile material presented thereto, portions of the rubber squeezing up in between the various component yarns of the fabric being treated and holding these yarns under tight frictional engagement. Where this engagement takes place it will be noted that the rubber, which presents a continuous smooth surface for engagement by the material being treated, is distorted by being convexed so that the superficial area of any selected portion is extended beyond what it would be if it were not so convexed.

The amount of this surface extension varies directly with the thickness of the belt and inversely with the radius of the drum or pulley 2, being in accordance with the expression $$\frac{R+t}{R}$$

where R is the radius to the neutral axis of the belt, which with the substantially non-extensible and non-contractible inner belt surface, is substantially the radius of the drum or pulley 2 and $t$ is the distance from this neutral axis to the outer face of the belt which is approximately the belt thickness. The rubber portion may be an inch or an inch and a quarter or even more in thickness, so that with pulleys or drums of moderate size a very substantial amount of shrinkage may be produced by a single pass of material to be treated through the machine.

As the rubber portion passes from the convex to the relatively straight path, however, this distortion is more or less relieved and the rubber tends to resume an undistorted condition, causing the normal superficial area of any given portion of the rubber to diminish in lengthwise dimensions. Due to the engagement of its continuous surface in the interstices of the textile material, this textile material is also caused to partake of this shortening of superficial area, causing the weft or filling strands to be crowded closer together as shown in Figure 7 to the right of the point 28, and causing a greater sinuosity of the filling strands about the warp strands, and this results in a lengthwise shrinking of the fabric.

By supporting the belt firmly on the upper face of the support 20 the rubber is held into close engagement with the textile material during this elastic recoil from deformed condition and thus a portion of the reduction in superficial area of the belt is imparted to the fabric. For example, the surface contraction of the belt may be 20%, while the resultant contraction or shrinkage of the cloth may be about 6%. This action is facilitated in some cases by preliminarily treating the fabric, as by moisture, to soften the gums and waxes therein so as to decrease the resistance of the textile material to the shrinking operation. This may be done, as shown in Figures 1 and 4, by the use of a steam pipe 42 discharging steam through orifices in the lower part of a horizontal portion 43 thereof into a larger pipe 44 concentric therewith and having apertures for the escape of steam through its top. A suitable drain (not shown) may be provided to remove the condensate from the interior of the pipe 44. Heating the ironing bar 25 then acts to dry out the material though, on account of the non-absorbent and non-porous nature of both the rubber, and the ironing plate, to less than bone dry condition, after it is shrunk and to set the material more or less in its shrunken condition.

While it has been proposed to effect shrinkage by the use of a fabric or felt belt arranged to travel in a path of variable curvature, such a belt does not present a continuous non-porous surface to the textile material. This results in the presentation to the textile material of a more or less broken or disconnected porous surface through which moisture may pass from or to the textile material. Since it is desirable to apply heat during the shrinking operation, this porous nature of the belt causes the heat to dry out and set the material treated. The smooth, non-porous rubber surface and the non-porous surface of the cooperating means which holds the textile material in contact with the rubber does not permit the passage of moisture and does not permit the textile material to be dried out substantially when treated. This produces a more uniform and in general a softer finish than when felt or fabric belts are employed, particularly in connection with heat. Likewise also the permissible thickness of a fabric or felt belt relative to the smallest radius of curvature through which the belt passes is limited by the ability of the belt to open up its surface without disruption or too great weakening of its structure, or by the production of undesirable marking on the material being treated. A much thicker rubber belt portion can be used since the rubber surface remains continuous with large deformation within the limits of tensile strength of the rubber. The thicker rubber belt coupled with the greater cohesive strength of the rubber causes the superficial deformation to be extended over a much longer area than is the case with the thinner and less cohesive fabric or felt belt, so that the dimensional change in the material treated occurs more gradually for the same belt speed and requires less careful control for uniformity of action.

There is a tendency for the textile material to regain something of its original length as it passes out from beneath the heavy pressure of the ironing bar 25 and the amount of this may be regulated to some extent by the temperature of the ironing bar 25, the higher this temperature, the less being the tendency of the material treated to resume something of its original length. There is, however, a limit to the amount of heat which can be used without injuring the goods. Consequently it is desirable to shrink the goods initially to an extent somewhat more than that desired in the finished material and then to permit a slight lengthening or in some cases even to actually stretch the goods to such a point that the desired amount of shrinkage is ultimately produced. It will be noted that the force exerted to shrink to material is at least to a considerable extent that of the elastic recoil of the rubber itself which is of a very forcible character so that very great shrinkage can be obtained if desired. In fact considerably more shrinkage than would take place in the fabric through usual laundering operations can be obtained so that the fabric can be caused to elongate in subsequent laundering.

It will, of course, be understood that it is quite possible to use a belt without the inner fabric layer which is relatively non-extensible and non-shrinkable, in which case both sides of the belt would partake of superficial area changes, the neutral axis being then positioned substantially midway between the outer and inner faces of the belt. In such an arrangement, however, the amount of belt surface contraction produced for the same thickness of belt and size of pulley would be reduced to approximately one-half that which can be produced by using the substantially incompressible and inextensible inner layer, this reduction being due not only to the decreased thickness of the belt from the neutral axis to its outer surface, but also to the increased radius of the neutral axis from the center of curvature of the convex portion of the belt for a given pulley radius.

As before noted it will usually be found more satisfactory to produce an initial shrinkage somewhat greater than that which is desired ultimately in the material treated, and then to reduce the shrinkage to the desired extent. Mechanism which may be used to modify to a greater or less extent the initial shrinkage of the material is shown in Figures 1, 8, and 9. This mechanism comprises a pair of supporting standards 50 adjustably secured to the top faces of the side frames 1, this adjustment being lengthwise of the belt travel. Each of the standards is provided with a vertical way 51 within which may ride trunnions 52 and 53 of a pair of superposed friction rollers 54 and 55, respectively. One of the walls of each of these ways is shown as formed by a bar 56 pivoted as at 57 at its lower end and secured in spaced relation to a bar 58, which forms a fixed portion of the standard, as by means of a latch element 59 pivoted at 60 to the bar 58 and having a socket 61 to receive a top portion 62 of the bar 56. By lifting this latch member 59 the bar 56 may be swung forwardly, thus releasing the rollers 54 and 55 so that they can be removed or replaced as desired.

In the position of the parts shown in Figure 1 the roller 54 rests on the upper face of the treating belt where it is in straight condition before it passes about the pulley 3 while the roller 55 rests in frictional engagement with the roller 54. The rollers are thus driven by their engagement with each other and with the face of the belt at a peripheral speed almost exactly equal to that of the belt where it is in its straight path. If, therefore, the textile material passing from beneath the ironing bar 25 is passed over and in engagement with the upper roller 55, it will be fed off by this roller 55 from the feeding belt at a peripheral speed substantially the same as that at which it was driven by the belt after the shrinking operation so that it is led out from the machine without any stretching effect subsequent to the shrinking. It then falls substantially unrestrained to the chute 65 and substantially all the shrinkage obtained by its treatment beneath the ironing plate 25 is retained therein. If now the standards 50 are moved forwardly in the direction of feed of the belt into the position shown in Figure 8 where the lower roller 54 engages the belt surface beyond the point where it is flat and where it partakes of the curvature caused by passing around the pulley 3, the outer surface of the belt then becomes elongated and its superficial speed is increased. The peripheral speeds of the rollers 54 and 55 are therefore correspondingly increased, and if the shrunken material is then passed over the roller 55, this roller in advancing the textile material exerts a stretching action on this material tending to decrease the ultimate amount of shrinkage of the goods.

There is also a third arrangement of the rollers shown in Figure 9 in which the lower roller 54 is supported out of contact with the feeding belt, being placed in lateral and downward extensions 70 of the ways 51, these being formed by a downwardly inclined notch in the lower portion of each bar 58. In this position the rolls 54 and 55 are not driven and the material treated may pass therebeneath. Due to the relatively light engagement of the shrunken material with the surface of the belt as it passes over and about the roller 3, a relatively small amount of stretching action is produced thereon which gives a stretching action intermediate that produced by the arrangement of the rollers shown in Figures 1 and 8. Adjustments of the amount of ultimate shrinking obtained intermediate what can be accomplished by these three adjustments of the rollers 54 and 55 may be readily accomplished by varying the temperature of the ironing bar 25.

As shown the textile material to be treated may be carried on a suitable roll at 75 and may be passed about suitable straightening devices as the rolls 76 and 77 before it is passed beneath the portion 30 of the ironing bar for its shrinkage treatment. After being deposited in the chute 65 after the shrinking operation has been completed it may be led to any suitable plaiting or other mechanism by which it may be suitably arranged for shipment. Where it is desired to wind the treated textile material in batches, the upper roller 55 may be replaced by the batching roller 63 of Figure 10.

Due to the rubber in conjunction with the heavy pressure to which the material is subjected during the shrinking operation, it is found that the finish of the goods is often materially enhanced by the treatment and it should be observed that very heavy pressures may be produced by the use of the hydraulic mechanism for pressing the ironing bar 25 downwardly, and that this may be done without impairing the belt, the rubber being well able to withstand such heavy pressures. Particularly this imparts a superfinish to cotton and artificial silk fabrics, this superfinish being characterized by a silkiness and mellowness unobtainable by other types of finishing machinery. When artificial silk fabrics are so treated the objectionable metallic luster and harshness of feel which usually characterize such goods are removed, the goods being thus de-lustered and softened while being shrunk, this finishing effect being often of sufficient importance to warrant this treatment without particular relation to the shrinkage produced. The use of the relatively incompressible but deformable material such as rubber for the outer surface portion at least of the treating belt and of the substantial thickness which can be used, makes possible the use of these heavy pressures. The heavy pressure forces the rubber in between the yarns, pressing individual fibers against their yarns and thus smoothing the yarns and holding them against undue flattening due to the pressure. This results in giving the material a special finish, retaining the weave of the fabric, as compared with that which can be obtained by the use of a surface material incapable of fitting in and conforming to the yarn surfaces. The squeezing in of the rubber around the yarns holds the yarns in their relative positions during changes in the extent of the rubber surface, and these changes have an appreciable effect in "breaking down" the fabric to a soft condition. On voiles or other open fabrics the rubber has been found to hold the warp yarns in line during shrinkage and the fibers are more confined so that while "construction" may be increased, nevertheless the voids between the yarns are not filled up by a fuzzing or by a flattening of the yarns. The pressure and heat also act to set the material, which is of importance, since the non-absorbent non-porous natures of the rubber surface and the ironing plate do not permit the material being bone dried while confined between the rubber and plate. A lighter pressure does not set the material as well as a heavy pressure, but it does allow a fabric to retain its woven appearance of bead and whenever other conditions make the use of heavy pressure undesirable, the lighter pressures may be used and yet produce beneficial effects, including shrinkage or stretch and desirable characteristics of finish.

This general type of machine may also be used for stretching instead of shrinking, in which case the fabric to be stretched will be passed through the machine in the opposite direction from that shown in Figure 1. Such an arrangement is shown in Figure 11 in which the fabric to be stretched is fed from the supply 100 past the straightening devices 101 and about a guide roll 102 and is presented to the surface of the treating belt where it is substantially flat beneath the ironing bar 103. As shown this ironing bar differs from the ironing bar 25 previously described, in that it has a short lip portion 105 above the straight stretch of the belt and the lip 104 about the convexed portion is somewhat extended. The action of the device when stretching the goods is the reverse of that when shrinking the goods, the goods being presented to the belt where it is relatively undistorted and being removed therefrom where it is distorted and with its superficial area extended. Preferably also the material is preliminarily moistened, as by the steam jet 106, to soften the waxes and starches, and make the stretching operation easier.

In the mechanisms heretofore described the belt has been passed with its distortable portion in both a convex and a straight path. It may, however, be passed in a concaved path and a straight path, or in both a convex and a concave path, as shown diagrammatically in Figures 12 and 13, the material to be treated being held in contact with the belt surface while that surface is changing at least predominantly in one direction, whether decreasing or increasing. For instance, in Figure 12 the belt is passed about the pulleys 110, 111, and 112 with its deformable portion outwardly presented thus to travel in a convex path, and it is passed about the pulley 113 between the pulleys 110 and 112 with its deformable portion inwardly presented, thus to be arranged in a concave path. Thus the rubber portion may be distorted to have its superficial area lengthwise extended about the pulleys 110, 111, and 112 and then undistorted or even distorted in the reverse direction to decrease the length of superficial area where it passes about the pulley 113. The amount of distortion in passing about the pulley 113 will depend on the initial tension of the belt, as it must pass through a distortion to elongate its superficial area, then through a neutral undistorted condition and through a distortion in the opposite sense where its superficial area is contracted. The textile material may then be fed to the belt before its superficial area is shortened by passing around the pulley 113 and may be removed from the belt after such superficial shortening has taken place, or if desired, of course, it could be applied to the belt, say, where the rubber portion is distorted in convex relation over the pulley 110, in which case the amount of shrinkage would be increased over that produced by presenting it to the belt surface just before the deformable portion is concaved. In Figure 13 a modification of this is shown in which but three supporting pulleys 120, 121, and 122 are employed, the rubber portion of the belt being distorted to increase the length of superficial area over the convex portions and having its superficial area decreased lengthwise as it passes over the pulley 122 in concaved relation. It will be noted that the intermediate pulleys or rollers 113 and 122 are positioned to increase the arcs of contact between the belt and the pulleys or rollers on each side and that these intermediate pulleys or rollers nip the belt against one only of these other rollers, the member 113 nipping the belt against the member 110 in Figure 12 and the member 122 nipping the belt against the member 120 in Figure 13. This insures gripping of the textile material against the belt surface where it passes from convex to concave to effect shrinkage, and separation of the material from the belt without any substantial stretch by reason of the reversing curve direction of travel over the pulleys or rolls 112 and 121, respectively.

It is not necessary, however, that the deformation of the deformable material which produces the shrinking or stretching actions be produced by a change of its path of motion as between convex and straight paths, or straight and concave paths, or convex straight and concave paths. Mechanism in which another method of distortion is employed is shown more especially in Figures 14 to 21. A simple form of this mechanism is shown in Figures 14, 15, 20, and 21 in which a pair of cooperating rolls 150 and 151 are employed. One of these, as the roll 151, is formed or covered with a relatively soft deformable material such as soft rubber, and the other is formed or surfaced with a harder material, and they are pressed together under heavy pressure as by the hydraulic cylinders 155 and are driven in opposite directions but at different mean peripheral speeds. As shown, for example, in Figures 14 and 20, the relatively hard surfaced roll 150 is rotated through a belt drive 156 which rotates a drive shaft 157 geared through the meshing gears 158 and 159 to the shaft 160 of the roll 150. The mating soft surfaced roll is driven at a definitely relatively lower or higher mean peripheral velocity depending on whether shrinkage or stretching of the material is desired. As shown this is accomplished through a change gear arrangement indicated at 165. Any suitable change gear mechanism may be used, but as shown the shaft of the roll 150 has fixed thereon three gears 166, 167, and 168 with which any selected gear 169, 170, and 171 splined to the shaft of the gear 151 may be selectively engaged by shifting the lever 172. This gear mechanism as shown provides for three definite speeds of rotation of the roll 151, each lower than that of the roll 150, thus to provide for shrinkage of material passed therebetween as will be more fully explained.

Referring to Figure 21, it will be noted that the combination of pressure exerted between the rolls and their relatively different velocities causes the harder surfaced roll 150 to press into the softer surface of the roll 151 and to stretch the material of this softer surface toward the outgoing side of the nip between these rolls to form a hump 152. The material to be treated shown at 153 engages the surface of the softer roll where it has been distorted by the action of the harder surfaced roll, tending to force the material of the softer roll through the nip faster than the mean peripheral speed of the softer surfaced roll. As soon as the material 153 has passed through the nip it is in contact with the softer deformed material which is pulling back from the hump 152 toward and into the nip, which thus causes the superficial area of the softer material to contract where the textile material is in engagement therewith, thus producing the desired shrinkage of the material. The amount of this shrinkage may be controlled by adjusting the relative mean peripheral velocities of the two rolls, the greater this difference in velocities the greater being the amount of shrinkage. Another factor which determines the amount of shrinkage imposed in the fabric is the relative or difference in co-efficients of friction of the co-acting surfaces. For instance, the surface which expands and contracts must, during its contraction, retain its grip on the fabric as it passes out of the machine, and the harder surface must have only sufficient frictional hold on the opposite side of the fabric to allow the soft rubber to take charge of the fabric where the continual recoiling action is taking place. If the harder surface is highly polished its effect in stretching the rubber is not as great as if dulled, because greater slip takes place, which is shown by glaze or a calender effect on the fabric; yet it must be understood that the degree of shrinkage produced under these conditions may be sufficient to resist laundering. Dulling the surface of the hard surfaced roll, therefore, gives more stretch to the rubber in front of the nip, and consequently increased shrinkage due to more recoil can be obtained, if desired, but if this dulling is carried too far, say, for instance, to the point of being engraved or milled the shrinkage cannot be effected, and a slight extension of the fabric has been obtained under such conditions. From the foregoing it is clear that the hard surface must not interfere with the recoiling action of the soft rubber beyond the nip, and although the hard surfaced material is traveling in the direction of the cloth feed to the machine, its surface must be smooth enough to allow the slipping back of the fabric in the opposite direction to the cloth travel. It will be clear now that while a hard engraved roll will function particularly well in creating the necessary reservoir of the recoiling rubber beyond the nip, this recoiling rubber will not retain its grip on the fabric, but will merely slip over it and distort the fibers, due to the other side of the fabric being firmly embedded in the engraving. It might be noted that the pulling force which stretches the soft rubber is actually transmitted through the fabric before it is shrunk; therefore the hard surfaced material can be credited with having two functions, first, to stretch the softer material, and second, to allow the fabric to be slipped back over its surface after the point of maximum pressure has been passed. The backward movement of the fabric over the harder roll is obviously the measure or theoretical degree of machine shrinkage, and while a large portion of this shrinkage releases itself, there remains in the fabric a sufficient amount of shrinkage to substantially resist standard laundry treatment. It is quite possible to so control the initial shrinkage that, if so desired for any special purpose, the fabrics will extend to a predetermined extent when laundered. Hard and soft rubber have been found in practice to be admirably suited for the surface materials of these two rolls. For example, the relative hardness of the rubber of the two rolls may be 75° to 80° and 95° to 100° registered on the "Shore" type of durometer instrument. The hard rubber presents a surface which does not produce a glazing effect and yet which permits the softer rubber of the softer surfaced roll to have a greater frictional effect on the material and to substantially control the speed with which the textile material emerges from the nip between the rolls. Other materials such as cloth, paper, or even dull finished, but relatively smooth metal, may be found satisfactory for the harder surfaced body. A dull finished steel roll is about equal to the hard rubber roll for general work. For special finishes one or the other may be found preferable. One or both of these rolls may be provided with heating or cooling means as may be found desirable in any particular instance. While the textile material may be preliminarily steamed or otherwise treated to soften the waxes and starches to facilitate the shrinkage or stretching operation it has been found that with this method by the use of differential velocities of coacting materials of different hardness better results are usually obtained without added moisture to the material treated. In the case of the stretching operation it is only necessary that the softer surfaced roll be run at a greater mean peripheral speed than that of the harder surfaced roll, in which case the softer material is forced into a hump at the entering side of the nip and accelerates the feed of the material to be treated into the nip, while the harder surfaced roll may substantially control the rate at which the textile material emerges from the nip. As in the devices previously described, the soft rubber presents a continuous smooth surface to contact with the textile material so that the desirable trade finish appears thereon as the textile material emerges from contact with the rolls.

Figure 15 differs from Figures 14, 20, and 21 only in the fact that the softer surfaced roll is positioned above the harder surfaced roll.

In Figures 16 to 19 modifications of this general method in which also changes of contour of the treating surface may be utilized are illustrated. In Figure 16, for example, instead of forming the softer surface element as a roll, it is formed as a belt 180 passed about a pair of pulleys 181 and 182 and with which cooperates a hard surfaced belt 183 passed over a pair of pulleys 184 and 185. These belts are so related that a heavy pressure is exerted between them adjacent to the pulleys 181 and 184 where the textile material enters therebetween, the pulleys 185 and 182 being somewhat separated so that by driving the belt 180 at a speed less than the belt 183, the softer belt material is distorted, forming a hump at 186 which tends to pay back into the nip between the belts and thus produce the shrinkage effect on the textile material.

In Figure 17 a soft surfaced roll 190 is used in conjunction with a hard surfaced belt 191 supported on the pulleys 194 and 193. The soft surfaced roll 190 is rotated at a less peripheral speed than the hard belt 191, which results in a distortion of the soft material and the formation of the hump 192 which pays back into the nip and produces the shrinkage effort on the textile material passed therebetween.

In Figure 18 a relatively hard surfaced roll 200 is used in conjunction with a relatively soft and deformable belt 201 supported on pulleys 202, 203. The belt is run at less surface velocity than the roll 200, thus distorting the material of the belt and forming a hump at 204 of the soft material which tends to pay back into the nip and exerts the shrinkage effort.

In Figure 19 a relatively soft and deformable belt 210 supported on pulleys 211 and 212 is used in conjunction with a relatively hard belt 213 supported on pulleys 214 and 215, which is driven at a greater peripheral velocity than the soft belt and forms a hump 216 which exerts a shrinking effort on the textile material passed between the belts. In this form also advantage may be taken of a surface contraction of the soft belt as it is concaved in passing over the pulley 215.

A similar effect also occurs in the construction of Figure 18 and the arrangements in Figures 12 and 13 may also utilize differences in relative velocities of the belt drive and the peripheries of the pulleys 113 and 122, respectively, if desired.

By causing the softer surface material to be moved at a greater velocity than the cooperating harder surface material in any of the constructions illustrated in Figures 12, 13 and 15 to 19, stretching instead of shrinking may be produced as described in connection with Figures 14 and 20.

In all the instances described where differential speed of confronting relatively hard and soft bodies is employed, it will be noted that there is a local distortion of the softer elastic distortable body beyond that which is occasioned by the passage of successive portions of the body through the various parts of the closed path in which they travel.

By causing this local distortion to occur in proximity to distortion caused by a variable curvature of the path through which the rubber surface is passing, these two causes of distortion can both be utilized in effecting a dimensional change of the textile material. Thus the rubber surface may be distorted by causing the harder surfaced body to travel at a greater surface speed than the normal speed of the rubber surface, in proximity to a location where the rubber is also being distorted by passing from a more to a less convexed path, both of which actions cause shrinkage of the textile material held against the rubber surface by the harder surfaced body.

The production of dimensional change of textile material by differential speed of confronting surface members, one harder than the other and between which the material is pressed, is not per se claimed herein, but forms subject matter of a divisional application Serial No. 23,868, filed May 28, 1935.

From the foregoing descriptions of certain embodiments of this invention, which are given merely by way of illustration, it should be evident to those skilled in the art that many changes and modifications might be made without departing from the spirit or scope of this invention as defined by the appended claims.

We claim:

1. In combination, a belt having a deformable surface portion, spaced pulleys around which said belt passes with said surface portion outwardly presented to be elongated during its passage in a convex path therewith, means for supporting the inner face of said belt where it leaves the surface of one of said pulleys and close to said surface, a member disposed above said belt and said supporting means and between which and said belt textile material may be passed, and means for exerting heavy pressure of said member toward said belt and supporting means to hold said material against the face of said belt where said belt passes from contact with said pulley into contact with said supporting means.

2. In combination, a belt having a rubber surface portion, spaced pulleys around which said belt passes with said surface portion outwardly presented to be elongated during its passage in a convexed path therewith, means for supporting the inner face of said belt where it leaves the surface of one of said pulleys and close to said surface, a member disposed above said belt and said supporting means and between which and said belt textile material may be passed, and means exerting pressure of said member toward said belt and supporting means to hold said material against the rubber face of said belt where said belt passes from contact with said pulley into contact with said supporting means.

3. Apparatus for use in treatment of textile fabric and the like, which comprises a revolving drum, an ironing plate having a face part substantially following the curvature of said drum and a part substantially tangential thereto, a rubber belt passing between said plate and drum, and a support for said belt having a face substantially parallel to the tangent portion of said plate and between which and said plate said belt passes.

4. In combination, a member, means for supporting and moving said member to produce different surface velocities thereof in different portions thereof, means for holding textile material against said surface where it is changed from a greater to a less velocity whereby to effect mechanical shrinkage of said textile material, textile-advancing means beyond said holding means in the direction of travel of said surface, and means for driving said advancing means from the surface of said member selectively where said surface is traveling at different velocities whereby said advancing means may be effective to stretch said shrunken material to an extent dependent on the selected portion of said surface.

5. In combination, a belt having a deformable surface portion, spaced pulleys around which said belt passes with said surface portion outwardly presented, means for rotating one of said pulleys to drive said belt, means cooperating with said belt substantially where it leaves one of said pulleys to shrink textile material engaged with said belt, and means driven by said belt selectively before or after the belt starts to curve about the other of said pulleys for more or less stretching said shrunken textile material to thereby regulate the ultimate amount of shrinkage produced therein.

6. In combination, a frame, a pulley journaled in said frame, a belt passing around said pulley and having a surface portion passing from a less to a more convex path as it engages said pulley, standards carried by said frame and adjustable thereon lengthwise of said belt, a friction roller journaled in said standard for engagement with said belt and through the adjustment of said standards at portions of said belt where said surface is more or less convex, and a second friction roller journaled in said standards in frictional engagement with said first mentioned roller.

7. In combination, a pair of spaced standards each having a substantially upright way therein with a laterally downwardly extending branch of less depth, one side of each way comprising a post hinged at its lower end, a latch part for securing the upper end of each post in operative position, and a pair of friction rollers having journal portions riding in said ways and readily removable therefrom by release of said latch and the swinging of said posts from operative positions.

8. In combination, a belt having a deformable surface portion, spaced pulleys around which said belt passes with said surface portion outwardly presented, a frame in which said pulleys are journaled, means for driving one of said pulleys to cause said belt to travel, means cooperating with said belt substantially where it leaves the surface of one of said pulleys for shrinking textile material adhering to said belt surface, standards adjustably secured to said frame, a friction roller, said standards having means for selectively journaling said friction roller into or out of frictional engagement with said belt, said adjustment permitting said friction roller to engage said belt surface before or substantially at the engagement of said belt around another of said pulleys, and a second friction roller journaled in said standards in engagement with said first mentioned roller.

9. The method which comprises distorting a body of substantially uncompressible but elastically distortable rubber presenting a continuous smooth external surface to change from substantially normal the superficial area of a portion thereof and then releasing said body to some extent, and applying textile material to be treated to the surface of said portion and there holding it under heavy pressure while the area of said surface portion is so changed from one to the other of its conditions, to effect corresponding dimensional change of said textile material and to effect a trade finish on the rubber-engaged surface of said material comparable to the trade finish of material not so changed in dimension.

10. The method which comprises distorting a body of substantially uncompressible but elastically distortable rubber presenting a continuous smooth surface, to change from substantially normal the superficial area of a portion thereof, applying and holding under heavy pressure textile material to be treated to the surface of said portion and while it is in contact therewith permitting said body to more or less assume its undistorted condition through its inherent elasticity, to cause said surface to change in area toward normal and effect a shrinkage of said material to be treated and to effect a trade finish on the rubber-engaged surface of said material comparable to the trade finish of unshrunken material.

11. The method which comprises distorting a body of substantially uncompressible but elastically distortable rubber presenting a continuous smooth external surface to increase from normal the superficial area of a portion thereof, and applying textile material to be treated to the surface of said portion and there holding it under heavy pressure while said body of rubber is being so distorted, to effect a stretching of said material and to produce a trade finish on the rubber-engaged surface thereof comparable to the trade finish of textile material not so stretched.

12. The method of changing the area of textile material, which comprises producing alternate extension and contraction of a smooth rubber surface, applying textile material to said surface and there holding the textile material under sufficient pressure to squeeze the rubber in between and smooth the component yarns of said material while said surface is changing in area predominantly in one direction, and then removing said material.

13. The method of shrinking textile material, which comprises holding the textile material against a predominantly contracting rubber surface under sufficient pressure to squeeze the rubber in between and smooth the component yarns of the material.

14. The method which comprises alternately distorting and more or less releasing successive portions of a body of rubber presenting a continuous smooth external surface to cause by such distortion and release and the inherent elasticity of said body alternate extension and contraction of the superficial areas of said portions, and progressively applying textile material to be treated to the surfaces of said portions and there holding it under sufficient pressure to squeeze the rubber in between and smooth the component yarns of said material while said areas are changing from one to the other condition to thereby effect a dimensional change in said material in successively presented portions thereof and a smoothing of its constituent yarns, and then removing said material.

15. The method which comprises alternately distorting and more or less releasing successive portions of a body of elastically distortable rubber presenting a continuous smooth external surface, to cause by such distortion and release and the inherent elasticity of said body alternate extensions and contractions of the superficial areas of said portions, and progressively applying textile material to be treated to the surfaces of said portions and there holding it under sufficient pressure to cause the rubber to squeeze in between the component yarns of the textile material while said areas are changing from extended to contracted condition to thereby shrink said material and effect a smoothing of its constituent yarns, and then removing said material.

16. The method which comprises alternately distorting and more or less releasing successive portions of a body of elastically distortable rubber presenting a continuous smooth external surface, to cause by such distortion and release and the inherent elasticity of said body alternate extensions and contractions of the superficial areas of said portions, and progressively applying textile material to be treated to the surfaces of said portions and there holding it under sufficient pressure to cause the rubber to be squeezed in between the component yarns of the textile material while said areas are changing from contracted to extended condition to thereby stretch said material and effect a smoothing of its constituent yarns, and then removing said material.

17. Apparatus for use in the treatment of textile fabric or the like, comprising a body of smooth surfaced rubber, means for moving said body to present successive portions thereof into one position and to alternately distort and more or less release successive portions of said body to vary the superficial areas of said portions by such distortion and the subsequent resumption of their former conditions through their inherent elasticity, and means for pressing said textile material against the surface of said body where the superficial areas of said portions are being varied between relatively distorted and released conditions under sufficient pressure to cause the rubber to squeeze in between and smooth the component yarns of said material, to thereby effect a dimentional change of said material and a desirable finish on the rubber-engaged face thereof.

18. In combination, a continuous belt comprising a relatively thick body of elastically distortable rubber presenting a smooth surface to which textile material may be applied, means for supporting said belt for movement in a path of varying curvature to alternately distort and more or less release said rubber in successive portions of said path and thereby to vary the extent of its superficial surface, and means for holding textile material in facial contact with said surface under sufficient pressure to cause the rubber to squeeze in between and smooth the constituent yarns of the material while its superficial extent is being so altered, to thereby effect a dimensional change in said textile material and a desirable finish on the rubber engaged face of said material.

19. In combination, a continuous belt comprising a relatively thick body of elastically distortable rubber presenting a smooth surface to which textile material may be applied, means for supporting said belt for movement in a path of varying curvature to alternately distort and more or less release said rubber in successive portions of said path and thereby to vary the extent of its superficial surface, and means for holding textile material in facial contact with said surface while its superficial extent is being diminished, under sufficient pressure to cause the rubber to squeeze in between and smooth the constituent yarns as said belt passes from a more to a less convexed portion of its path to thereby effect shrinkage of the textile material and a desirable finish on the rubber-engaged face of said material.

20. In combination, a continuous belt comprising a relatively thick body of elastically distortable rubber presenting a smooth surface to which textile material may be applied, means for supporting said belt for movement in a path of varying curvature to alternately distort and more or less release said rubber in successive portions of said path and thereby to vary the extent of its superficial surface, and means for holding textile material in facial contact with said surface while its superficial extent is being increased as the rubber is passing from a less to a more convexed position of its path and under sufficient pressure to cause the rubber to squeeze in between and smooth the constituent yarns of the material, to thereby effect stretching of the textile material and a desirable finish on the rubber-engaged face of said material.

21. Apparatus for use in the treatment of textile fabric and the like, comprising a revolving drum, a pressure plate, a portion of which is concentric with a portion of the periphery of the said drum and another portion substantially tangential thereto, a band of india rubber passing between the said plate and the said drum, and over a supporting plate lying parallel with the tangential portion of the said plate, and means for feeding the fabric between the said plate and the said band.

22. In combination, a belt having a deformable surface portion, spaced pulleys around which said belt passes with said surface portion outwardly presented to be elongated during its passage in a convex path therewith, means for supporting the inner face of said belt where it leaves the surface of one of said pulleys and close to said surface, a member disposed above said belt and said supporting means and between which and said belt textile material may be passed, and means for exerting heavy pressure of said member toward said belt and supporting means to hold said material against the face of said belt where said belt passes from contact with said pulley into contact with said supporting means.

23. Apparatus for use in treatment of textile fabric and the like, which comprises a revolving drum, an ironing plate having a face part substantially following the curvature of said drum and a part substantially tangential thereto, a rubber belt passing between said plate and drum, and a support for said belt having a face substantially parallel to the tangent portion of said plate and between which and said plate said belt passes.

24. In a machine for altering a dimension of textile material, a continuous belt comprising a relatively thick body of elastically distortable rubber presenting a smooth, continuous non-porous surface having a high coefficient of friction to the textile material, means for passing said belt through a path of varying curvature to thereby more or less distort the rubber and produce variable velocity of such surface, non-porous means pressing the textile material against such surface where it is undergoing velocity change and causing the said material to partake of such velocity change to thereby change a dimension thereof, and means for heating the textile material while said dimension is being so changed, the non-porous nature of said rubber and pressing means acting to prevent substantial drying of the textile material while such dimensional change is being effected.

25. In a machine for altering a dimension of textile material, a continuous belt comprising a relatively thick body of elastically distortable rubber presenting a smooth, continuous surface having a high coefficient of friction to textile material and capable of resistance to distortion and when distorted having a powerful recoiling tendency to resume an undistorted condition, means for passing said belt through a path of varying curvature to thereby more or less distort or release the rubber and produce variable velocity of such surface, such variable velocity, due to the increased thickness and higher cohesive character of the rubber, causing the length of such surface within which such variable velocity occurs to be greater than that of the surface of a textile or felt belt traveling in a path of the same curvature variations, and means for holding textile material in facial contact with said surface where said surface is undergoing velocity changes predominantly in one direction.

26. In combination, a continuous belt comprising a relatively thick body of elastically distortable rubber presenting a smooth surface having a high coefficient of friction to textile material and capable of resistance to distortion and when distorted having a powerful recoiling tendency to resume an undistorted condition, means for passing said belt through a path of varying curvature to thereby more or less distort or release the rubber and produce variable velocity of such surface more gradual than that of said curvature variation, and means for holding textile material in facial contact with said surface where said surface is undergoing velocity changes.

27. A machine for changing the superficial area of textile material, which comprises an endless belt having a deformable rubber surface portion, a pair of spaced rolls about which said belt passes, and a third roll engaging said surface and between which and said surface the textile material extends, said third roll being positioned to increase the arcs of contact between said belt and said pair of rolls and to nip said belt against one only of said pairs of rolls, said machine including means for driving said belt.

28. A machine for changing the superficial area of textile material, which comprises an endless belt having a deformable rubber surface portion, a pair of spaced rolls about which said belt passes, and a third roll engaging said surface and between which and said surface the textile material extends, said third roll being positioned to increase the arcs of contact between said belt and said pair of rolls and to nip said belt against one only of said pairs of rolls, said machine including means for driving said belt, said belt surface being convexed over said one roll and concaved over said third roll, thereby to change the speed of motion of said surface as it passes from one to the other, and said belt being of substantial thickness and said surface being continuous and non-porous, to thereby increase the length of said belt throughout which said surface speed variation takes place.

29. A machine for shrinking fabric comprising a web-carrying belt, means for moving said belt through a path of varying curvature such as to produce contraction of its web-carrying surface, the machine including means for holding fabric in facial contact with said surface where said surface is predominantly contracting, said holding means being arranged to release the fabric in a contracted state, and said belt comprising a body of elastically distortable rubber and having a thickness of the order of an inch.

30. A machine for shrinking fabric comprising a web-carrying belt, means for moving said belt through a path of varying curvature such as to produce contraction of its web-carrying surface, the machine including means for holding fabric in facial contact with said surface where said surface is predominantly contracting, said holding means being arranged to release the fabric in a contracted state, and said belt comprising a body of elastically distortable rubber of which the web-engaging surface is smooth, possesses a high coefficient of friction to the fabric and is continuous both before and during said contraction.

31. A machine for shrinking fabric comprising a web-carrying belt, means for moving said belt through a path of varying curvature such as to produce contraction of its web-carrying surface, the machine including means for holding fabric in facial contact with said surface where said surface is predominantly contracting, said holding means being arranged to release the fabric in a contracted state, and said belt comprising a body of elastically distortable rubber of which the web-engaging surface possesses a high coefficient of friction to the fabric, the rubber retaining elastic structural continuity in its web-engaging side during all conditions of flexion of the belt resulting from movement through said path.

32. A machine for shrinking fabric comprising a web-carrying belt, means for moving said belt through a path of varying curvature, the variation in curvature and the thickness of the belt being such as initially to stretch the web-engaging surface lengthwise and then cause said surface to contract substantially, the machine including means for holding fabric in facial contact with said surface where said surface is predominantly contracting, and said belt comprising a body of elastically distortable rubber of which the web-engaging surface is smooth, possesses a high coefficient of friction to the fabric and is continuous in its stretched state.

33. A machine for shrinking fabric comprising a web-carrying belt, and means for causing the belt to move in a closed path, the machine including a guide member positioned to alter the direction of travel of the belt and in so doing cause the web-carrying surface of the belt to contract lengthwise, the machine being adapted to receive the fabric to be shrunk between the web-engaging surface and said guide member, the belt comprising a body of rubber of which the web-engaging surface is smooth, possesses a high coefficient of friction to the fabric and is continuous both before and during said contraction, whereby, without preliminary confinement of the fabric to the belt, to grip the fabric firmly where the belt runs onto said guide member and cause the fabric to partake of the contraction of the belt surface on said guide member, the machine being arranged to discharge the fabric from said belt while the fabric is in a contracted state.

JOHN HERBERT WRIGLEY.
ALEXANDER MELVILLE.